(12) United States Patent
Zhou (10) Patent No.: US 12,427,900 B2
(45) Date of Patent: Sep. 30, 2025

(54) MULTIFUNCTIONAL SIDE PILLOW ASSEMBLY

(71) Applicant: SHEN ZHEN STAND BY ME TECHNOLOGY LIMITED, Shenzhen (CN)

(72) Inventor: Zhiping Zhou, Huizhou (CN)

(73) Assignee: SHEN ZHEN STAND BY ME TECHNOLOGY LIMITED, Shenzhen (CN)

( * ) Notice: Subject to any disclaimer, the term of this patent is extended or adjusted under 35 U.S.C. 154(b) by 270 days.

(21) Appl. No.: 18/464,279

(22) Filed: Sep. 11, 2023

(65) Prior Publication Data

US 2025/0042316 A1    Feb. 6, 2025

(30) Foreign Application Priority Data

Aug. 1, 2023  (CN) .......................... 202322058620.8

(51) Int. Cl.
| | | |
|---|---|---|
| *B60N 2/80* | (2018.01) | |
| *B60N 2/882* | (2018.01) | |
| *B60N 2/885* | (2018.01) | |
| *B60N 2/90* | (2018.01) | |

(52) U.S. Cl.
CPC .................................. *B60N 2/885* (2018.02)

(58) Field of Classification Search
CPC .. B60N 2/885; B60N 2002/905; B60N 2/853; B60N 2/838; A47C 7/38
See application file for complete search history.

(56) References Cited

U.S. PATENT DOCUMENTS

| | | | | |
|---|---|---|---|---|
| 9,701,231 | B2 * | 7/2017 | Arriola ................. | B60N 2/882 |
| 10,220,753 | B2 * | 3/2019 | Chiang ................. | B60N 2/853 |
| 10,618,442 | B2 * | 4/2020 | Zhou ..................... | B60N 2/853 |
| D899,817 | S  * | 10/2020 | Zhou ............................. | D6/601 |
| 10,800,307 | B1 * | 10/2020 | Zhou ..................... | B60N 2/99 |
| 2018/0370398 | A1 * | 12/2018 | Chiang ................. | B60N 2/885 |
| 2019/0152371 | A1 * | 5/2019 | Carlson ................. | B60N 2/882 |
| 2020/0339022 | A1 * | 10/2020 | Zhou ..................... | B60N 2/986 |
| 2022/0063468 | A1 * | 3/2022 | Zhou ..................... | B60N 2/897 |

* cited by examiner

Primary Examiner — Shin H Kim (57) ABSTRACT

A multifunctional side pillow assembly is provided, including two rotating blocks and two side pillows. The side pillows are slidably disposed on outer walls of the rotating blocks through fixing frames and sliding grooves. Each fixing frame is slidably disposed on the corresponding rotating block through an adjusting assembly in a limited manner, and a clamping assembly is elastically disposed on the fixing frame for increasing a sliding friction on the rotating block. The side pillow slides along the outer wall of the rotating block through the fixing frame; when the limiting block is detached from a limiting groove, a limiting spring is thereby contracted, and then the limiting block slides and a spring block also slides; and when the limiting block slides to another limiting groove, the limiting block is clamped therein under an action of the limiting spring.

14 Claims, 9 Drawing Sheets

MULTIFUNCTIONAL SIDE PILLOW ASSEMBLY

TECHNICAL FIELD

The disclosure relates to the field of side pillow technologies, particularly to a multifunctional side pillow assembly.

BACKGROUND

The use of side pillows together with a vehicle seat can provide supports for sides of a head of a passenger during driving, especially during long-distance driving and resting, the use of side pillows can not only relieve riding fatigue, but also protect the head and a neck of the passenger in a traffic accident and reduce injuries in accidents. The side pillows are generally clamped to two insertion rods located at a bottom of a headrest of the vehicle seat by clamping limit blocks, thereby limiting a fixed bar at a side of the two insertion rods and further achieving assembly and installation between the side pillows and the vehicle seat.

The side pillows in the related art are generally rotationally installed on two ends of the fixed bar. When the side pillows are not in use, they are rotated and placed at two ends of the headrest of the vehicle seat. When the side pillows are in use, they are rotated to two sides of the head of the passenger after being seated at the vehicle seat, and both sides of the head of the passenger are supported by the side pillows. However, the above-mentioned side pillow is single in function, and when the passenger travels for a long time, the passenger needs to adjust head deflection to relax the neck of the passenger, and then to find a comfortable state. The comfortable state of head deflection varies among different people. Based on this, in order to meet the lateral support of different head deflection for different people, a multifunctional side pillow assembly is proposed.

SUMMARY

The disclosure provides a multifunctional side pillow assembly, which aims to solve the problems mentioned in the related art.

The disclosure is implemented as follows. The disclosure is provided with a multifunctional side pillow assembly, including two rotating blocks and two side pillows. Each side pillow is slidably disposed on an outer wall of a corresponding one of the rotating blocks through a fixing frame and a sliding groove; the fixing frame is slidably disposed on the rotating block through a first adjusting assembly in a limited manner; and a clamping assembly is elastically disposed on the fixing frame and is configured to increase a sliding friction on the rotating block.

In an embodiment, the clamping assembly includes a spring block and a clamping spring; the spring block is slidably disposed on a top end of the sliding groove in a limited manner, and the clamping spring is disposed on a top end of the spring block in a limited manner; and the clamping spring is configured to exert a downward elastic force on the spring block, and the spring block is configured to compress the rotating block to increase the sliding friction on the rotating block.

In an embodiment, the first adjusting assembly includes a first limiting block, a first limiting spring, and multiple first limiting grooves; the multiple first limiting grooves are formed at a bottom end of the sliding groove, the first limiting block is slidably disposed in the rotating block in a limited manner, and the first limiting spring is disposed at a top end of the first limiting block in a limited manner; and the first limiting spring is configured to exert a downward elastic force on the first limiting block to make the first limiting block be clamped into one of the multiple first limiting grooves, and the first limiting block clamped inside the one of the multiple first limiting grooves is configured to limit a sliding connection between the rotating block and the fixing frame.

In an embodiment, a second adjusting assembly is capable of replacing the first adjusting assembly to make the fixing frame be slidably disposed on the rotating block; the second adjusting assembly includes a second limiting block, a second limiting spring, and multiple second limiting grooves; the multiple second limiting grooves are defined on a side of the outer wall of the rotating block; the second limiting block is rotatably disposed in the fixing frame, and two ends of the second limiting block are respectively provided with a button and a limiting tooth; the button penetrates and extends outside the fixing frame, the second limiting spring is disposed on a side of the limiting tooth, and the second limiting spring is configured to clamp the limiting tooth into one of the multiple second limiting grooves.

In an embodiment, a third adjusting assembly is capable of replacing the first adjusting assembly to make the fixing frame be slidably disposed on the rotating block; the third adjusting assembly includes a third limiting groove, a third limiting block, and a third limiting spring; the third limiting groove is defined on the outer wall of the fixing frame, and a top end and a bottom end of the third limiting groove are respectively formed with multiple notches; the third limiting block is disposed on a side of the rotating block, and penetrates and extends outside the fixing frame through the third limiting groove; the third limiting spring is disposed in the rotating block in a limited manner and is disposed on an end of the third limiting block; the third limiting spring is configured to exert an outward groove force on the third limiting block; and a top end and a bottom end of the third limiting block are respectively formed with multiple protrusions matched with the multiple notches, and the outer wall of the fixing frame is provided with a retaining ring configured to limit the third limiting block.

In an embodiment, the disclosure further includes two connection seats; each of the two connection seats is rotatably connected to the rotating block through a rotating shaft and a fourth adjusting assembly in a limited manner, and the fourth adjusting assembly includes a spring column, a fourth limiting spring, and multiple adjusting grooves; the spring column is slidably disposed in the connection seat in a limited manner, the fourth limiting spring is configured to exert an upward force on the spring column, and the multiple adjusting grooves are defined at a bottom end of the rotating block.

In an embodiment, the disclosure further includes a fixed bar; two fixing blocks are slidably disposed on an outer wall of the fixed bar through two fifth adjusting assemblies, and the two fifth adjusting assemblies are configured to fix the fixed bar on insertion rods of a headrest of a vehicle seat; each of the two fifth adjusting assemblies includes a pressing block, a limiting piece, a fifth limiting spring, and multiple serrated grooves; the multiple serrated grooves are defined on the outer wall of the fixed bar, and each fixing block is slidably disposed on the fixed bar along a Y-axis direction, the limiting piece is slidably disposed in the fixing block along an X-axis direction in a limited manner, the fifth limiting spring is disposed on an end of the limiting piece, and the pressing block is slidably disposed on a top end of the fixing block along a Z-axis direction in a limited manner; and when the pressing block is pressed downward, the pressing block is configured to compress the limiting piece to move along the X-axis direction and detach from one of the multiple serrated grooves.

In an embodiment, the fixed bar defines a moving guide groove therein for sliding the fixing block in a limited manner, the limiting piece defines an inverted trapezoidal notch therein, and a bottom end of the pressing block is a frustum shape.

In an embodiment, an end of an outer wall of the fixing block defines a C-shaped groove, and the C-shaped groove is configured to clamp the fixing block with one of the insertion rods of the vehicle seat.

Compared with the related art, the embodiments of the disclosure can achieve beneficial effects as follows.

The disclosure is capable of pulling the side pillow by setting the first adjusting assembly, so that the side pillow slides along the outer wall of the rotating block through the fixing frame in a limited manner. Specially, when the first limiting block is detached from one of the multiple first limiting grooves, the first limiting spring is contracted by force, the bottom end of the first limiting block slides along the bottom end of the inner wall of the sliding groove inside the fixing frame in a limited manner. At the same time, the spring block also slides along the top end of the rotating block in a limited manner, and when the first limiting block moves to another first limiting groove, the first limiting block is clamped into the another first limiting groove under an action of the elastic force of the first limiting spring. Through the mutual cooperation of the above components, the side pillow is capable of realizing movement and position adjustment along the outer wall of the rotating block, which further meets the needs of different people for the use of the side pillow and makes the side pillow practical and convenient.

Reference numerals: 1—fixed bar; 2—connection seat; 201—mounting nut; 3—rotating block; 301—sliding groove; 4—side pillow; 401—fixing frame; 5—clamping assembly; 501—spring block; 502—clamping spring; 6—first adjusting assembly; 601—first limiting groove; 602—first limiting block; 603—first limiting spring; 7—second adjusting assembly; 701—second limiting groove; 702—second limiting block; 7021—button; 7022—limiting tooth; 703—second limiting spring; 8—third adjusting assembly; 801—third limiting groove; 802—third limiting block; 803—third limiting spring; 9—fourth adjusting assembly; 901—adjusting groove; 902—spring column; 903—fourth limiting spring; 10—fixing block; 101—C-shaped groove; 11—serrated groove; 12—pressing block; 13—limiting piece; 14—fifth limiting spring; 15—moving guide groove; 16—inverted trapezoidal notch; 17—rotating shaft; 18—notch; 19—protrusion; 20—retaining ring.

DETAILED DESCRIPTION OF EMBODIMENTS

Unless otherwise defined, all technical and scientific terms used herein have the same meanings as those commonly understood by those skilled in the related field of the disclosure. The terms used in the specification of the disclosure herein are only for a purpose of describing specific embodiments and are not intended to limit the disclosure. The terms "including" and "having" in the specification and claims of the disclosure and the above-mentioned description of the drawings and any variations thereof are intended to cover non-exclusive inclusions. The terms "first", "second", etc. in the specification and claims or the above-mentioned drawings of the disclosure are used to distinguish different objects, rather than to describe a specific sequence.

Mentioning "embodiments" herein means that a specific feature, structure, or characteristic described in conjunction with the embodiments may be included in at least one embodiment of the disclosure. The appearance of the phrase in various places in the specification does not necessarily refer to the same embodiment, nor is it an independent or alternative embodiment mutually exclusive with other embodiments. Those skilled in the art explicitly and implicitly understand that the embodiments described herein may be combined with other embodiments.

Embodiment 1

The embodiment of the disclosure provides a multifunctional side pillow assembly, as shown in FIGS. 1-6, which includes a fixed bar 1, two connection seats 2, two rotating blocks 3, and two side pillows 4. The two connection seats 2 are respectively rotatably installed on two ends of the fixed bar 1 through two mounting nuts 201, the two rotating blocks 3 are respectively rotationally installed on the two connection seats 2, and each of the two side pillows 4 is slidably installed on an outer wall of the corresponding rotating block 3 through a fixing frame 401 (i.e., a number of the fixing frame 401 is two) cooperated with a sliding groove 301 (i.e., a number of the sliding groove 301 is two) in a limited manner. The fixing frame 401 is installed on the rotating block 3 through a first adjusting assembly 6 in a limited manner, and a clamping assembly 5 is elastically disposed on the fixing frame 401 and is used to increase a sliding friction on the rotating block. The clamping assembly 5 includes a spring block 501 and a clamping spring 502, the spring block 501 is slidably installed on a top end of the sliding groove 301 in a limited manner, and the clamping spring 502 is installed on a top end of the spring block 501 in a limited manner. The clamping spring 502 is used to exert a downward elastic force on the spring block 501, and the elastically installed spring block 501 is used to compress the rotating block 3 for increasing the sliding friction. The first adjusting assembly 6 includes a first limiting block 602, a first limiting spring 603, and multiple first limiting grooves 601; the multiple first limiting grooves 601 are formed at a bottom end of the sliding groove 301, the first limiting block 602 is slidably installed in the rotating block 3 in a limited manner, and the first limiting spring 603 is installed on a top end of the first limiting block 602. The first limiting spring 603 is used to exert a downward elastic force on the first limiting block 602, and the first limiting block 602 is clamped inside one of the multiple first limiting grooves 601 to limit the sliding connection between the rotating block 3 and the fixing frame 401.

In the embodiment, by rotating the connection seat 2 along the end portion of the fixed bar 1, the side pillow 4 is thereby rotated from an end portion of a headrest of a vehicle seat to a portion above a shoulder of a passenger seated at the vehicle seat. By rotating the rotating block 3 and the connection seat 2, a tilt angle of the side pillow 4 is thereby adjusted to meet the needs of head deflection in different states.

When the side pillow 4 is pulled, the side pillow 4 slides along the outer wall of the rotating block 3 through the fixing frame 401 in a limited manner. And then, the first limiting block 602 detaches from one of the multiple first limiting grooves 601, the first limiting spring 603 thereby contracts under the force, and a bottom end of the first limiting block 602 slides along an inner wall of the sliding groove 301 inside the fixing frame 401.

At the same time, the spring block 501 slides along the top end of the rotating block 3. When the first limiting block 602 moves above another one of the multiple first limiting grooves 601, the first limiting block 602 is clamped in the another one of the multiple first limiting grooves 601 under the elastic force of the first limiting spring 603. Through the mutual cooperation of the above component, the side pillow 4 is capable of achieving movement and adjustment along the outer wall of the rotating block 3, thereby further meeting the needs of different passenger for the use of side pillow 4 and making the side pillow practical and convenient.

In an illustrated embodiment of the disclosure, as shown in FIGS. 1-3 and 6, the connection seat 2 and the rotating block 3 are connected through a rotating shaft 17 and a fourth adjusting assembly 9 in a limited manner. The fourth adjusting assembly 9 includes a spring column 902, a fourth limiting spring 903, and multiple adjusting grooves 901; the spring column 902 is installed inside the connection seat 2 in a limited manner, the fourth limiting spring 903 is used to exert an upward thrust on the spring column 902, and the multiple adjusting grooves 901 are opened on a bottom end of the rotating block 3.

In the embodiment, when the disclosure is in use, the rotating block 3 is moved to rotate and adjust by rotating the rotating shaft 17, the bottom end of the rotating block 3 thereby compresses a hemispherical structure disposed at a top end of the spring column 902, and then the spring column 902 moves downwards to compress the fourth limiting spring 903 to contract under the elastic force, causing the spring column 902 to detach from one of the multiple adjusting grooves 901.

Furthermore, when another one of the multiple adjusting grooves 901 at the bottom end of the rotating block 3 rotates to the top end of the spring column 902, the spring column 902 moves upwards and thereby clamps into the another one of the multiple adjusting grooves 901 under the elastic force of the fourth limiting spring 903, thereby achieving the rotational adjustment between the rotating block 3 and the connection seat 2.

Figure 1:
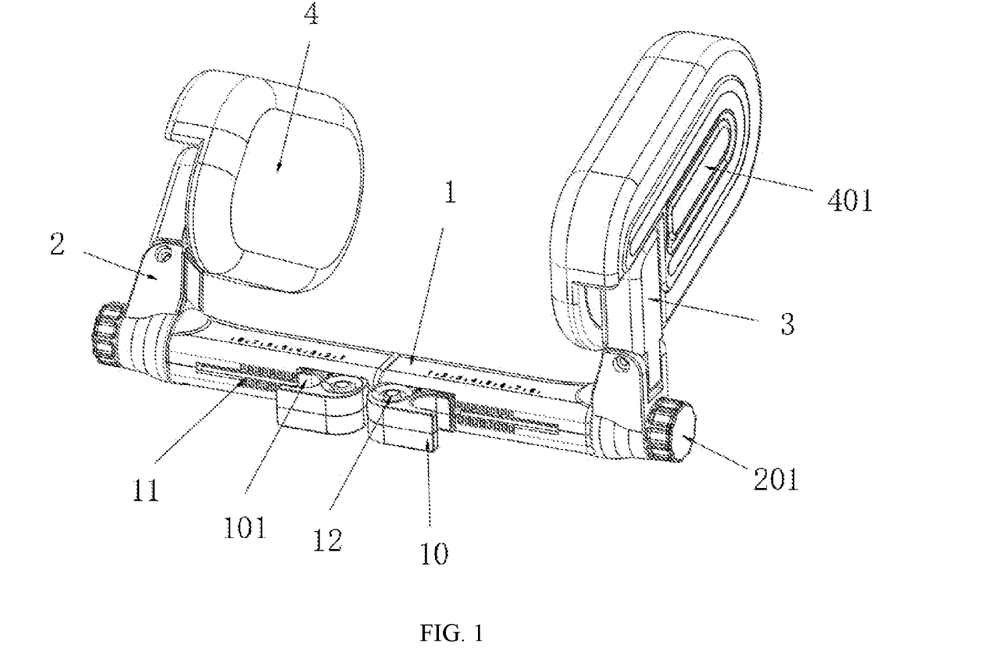
FIG. 1 illustrates a schematic structural diagram of a side pillow assembly according to an embodiment of the disclosure.
Figure 2:
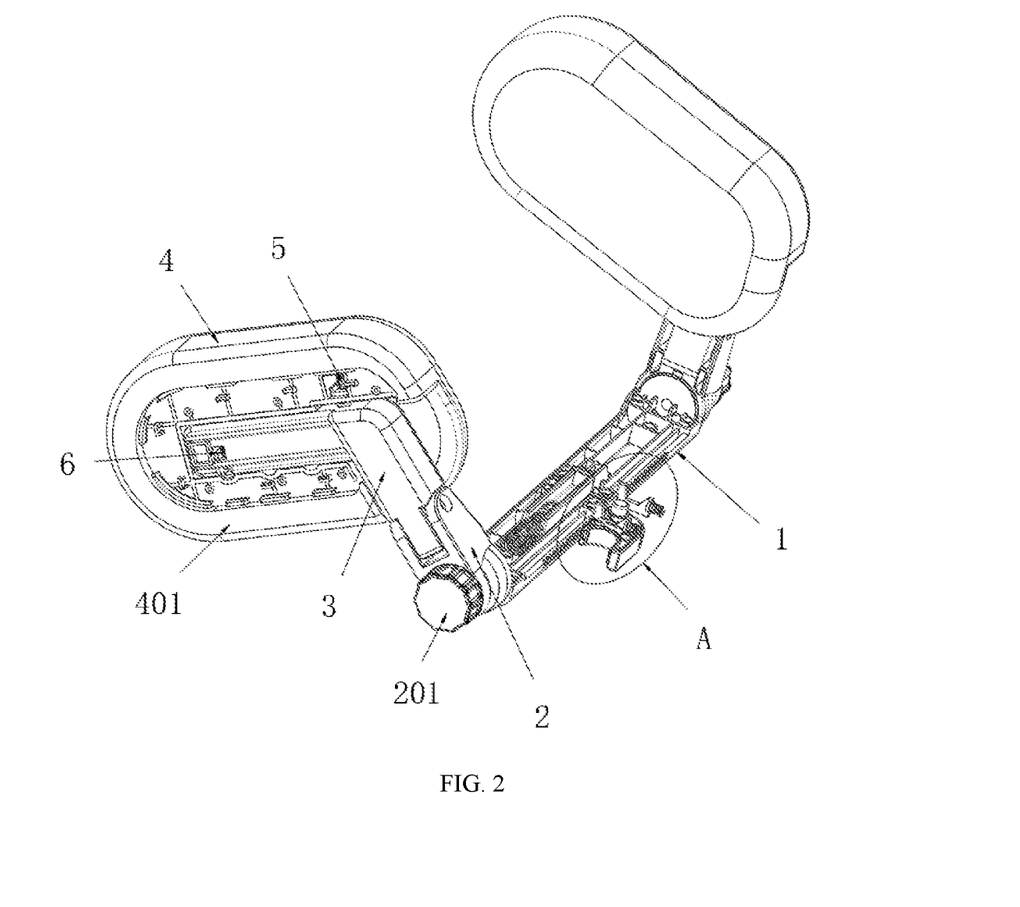
FIG. 2 illustrates a schematic sectional structural diagram of the side pillow assembly according to the embodiment of the disclosure.
Figure 3:
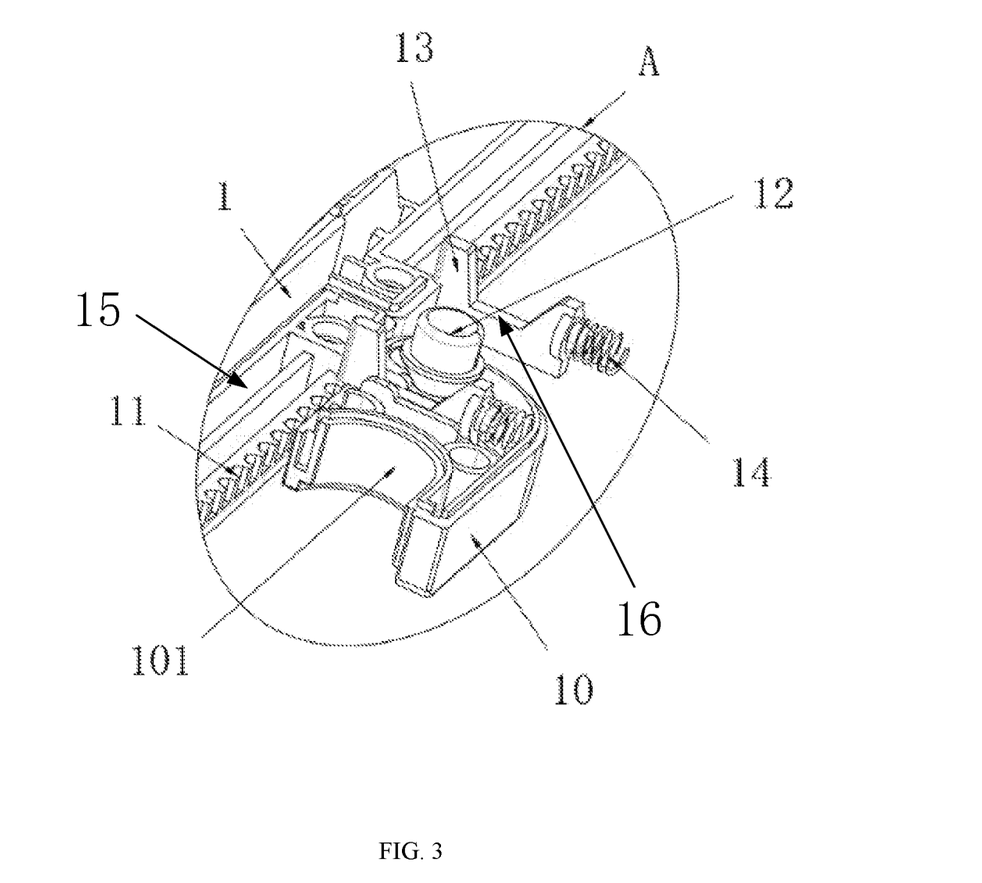
FIG. 3 illustrates an enlarged diagram of an A portion in FIG. 2 according to the embodiment of the disclosure.
Figure 4:
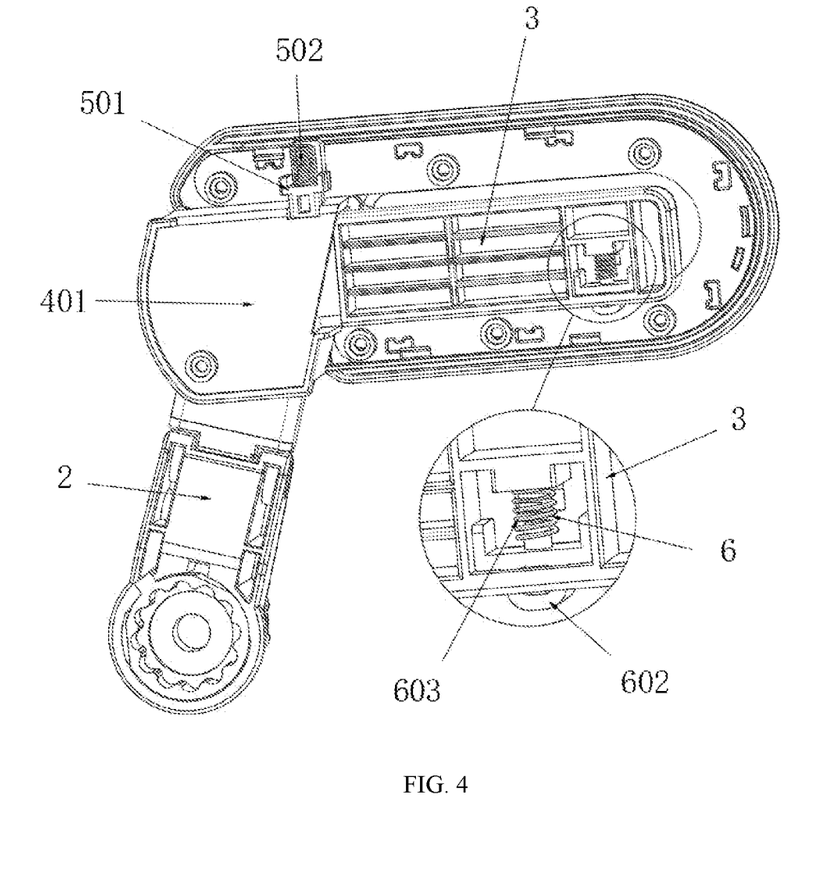
FIG. 4 illustrates a schematic sectional diagram of a connection seat connected to a fixing frame according to the embodiment of the disclosure.
Figure 5:
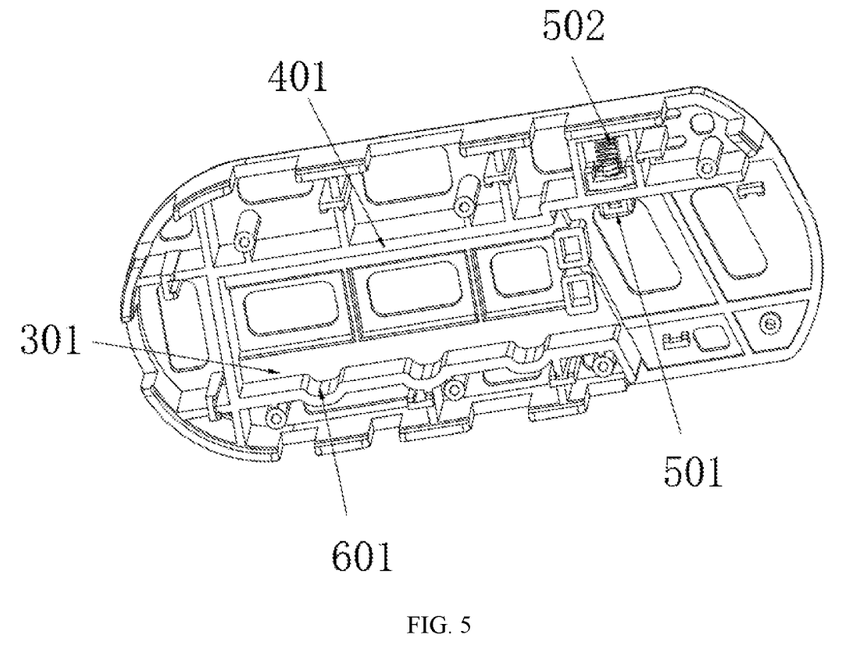
FIG. 5 illustrates a schematic structural diagram of the fixing frame according to the embodiment of the disclosure.
Figure 6:
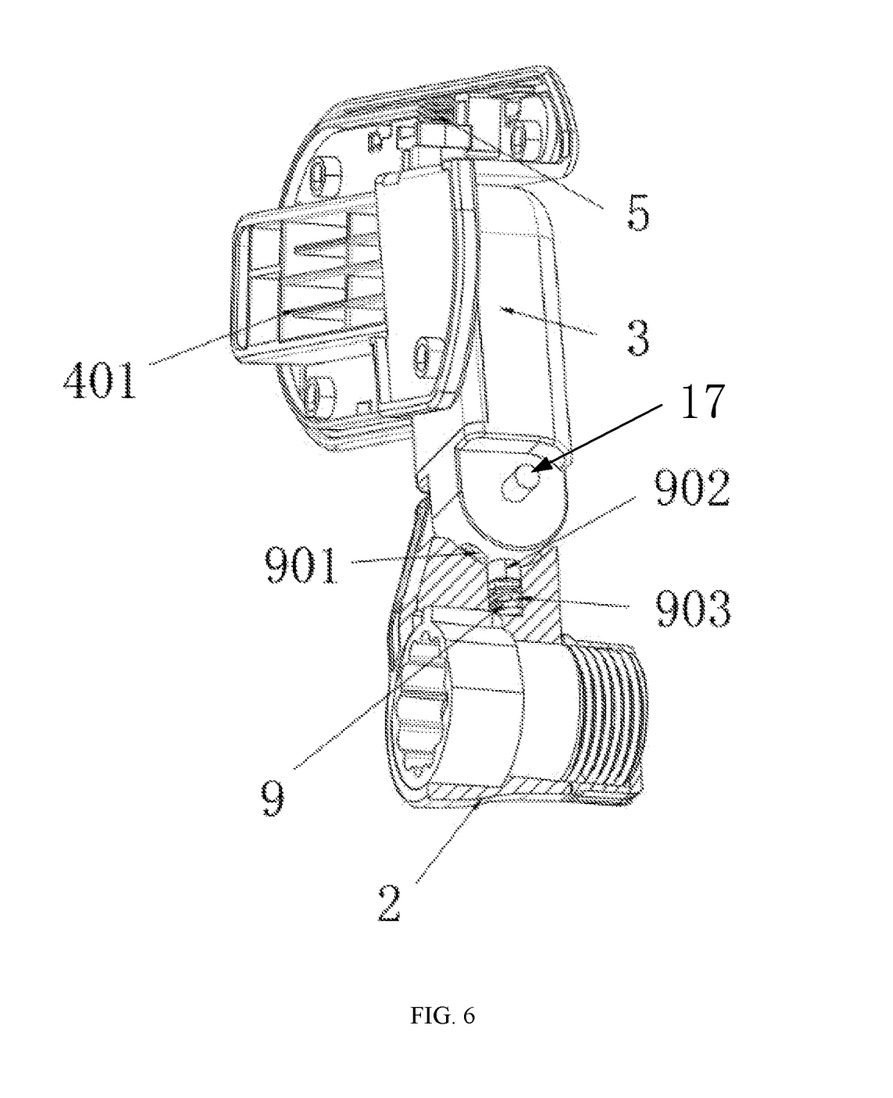
FIG. 6 illustrates a schematic sectional diagram of the connection seat connected to the fixing frame according to the embodiment of the disclosure.
Figure 7:
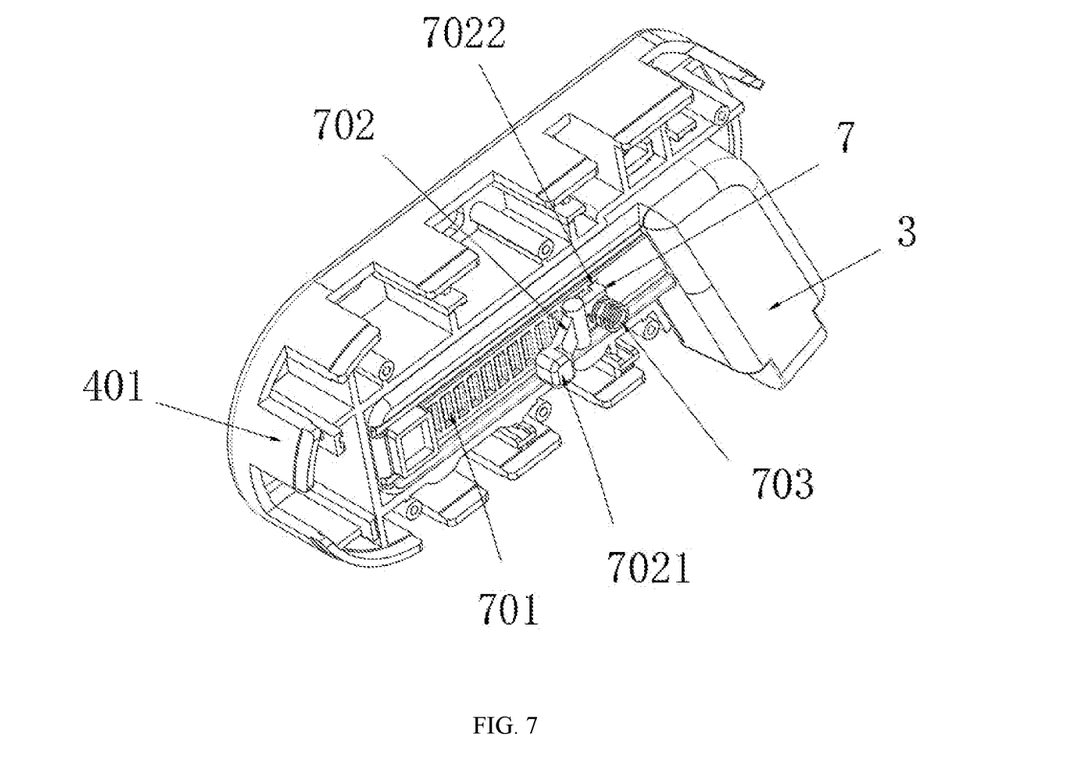
FIG. 7 illustrates a schematic diagram of a rotating block connected to a fixing frame according to another embodiment of the disclosure.
Figure 8:
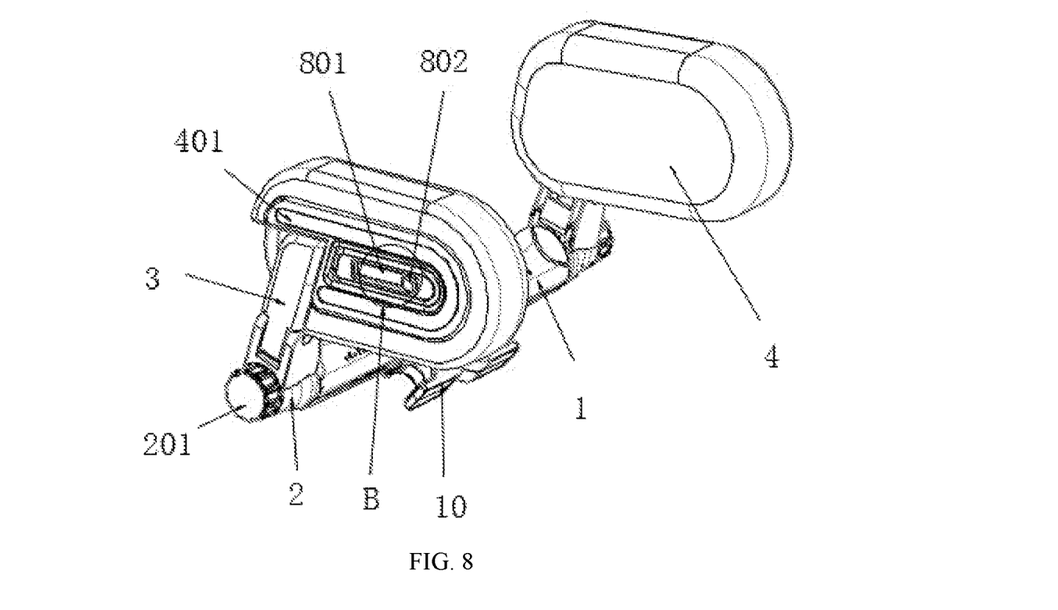
FIG. 8 illustrates a schematic structural diagram of a side pillow assembly according to still another embodiment of the disclosure.
Figure 9:
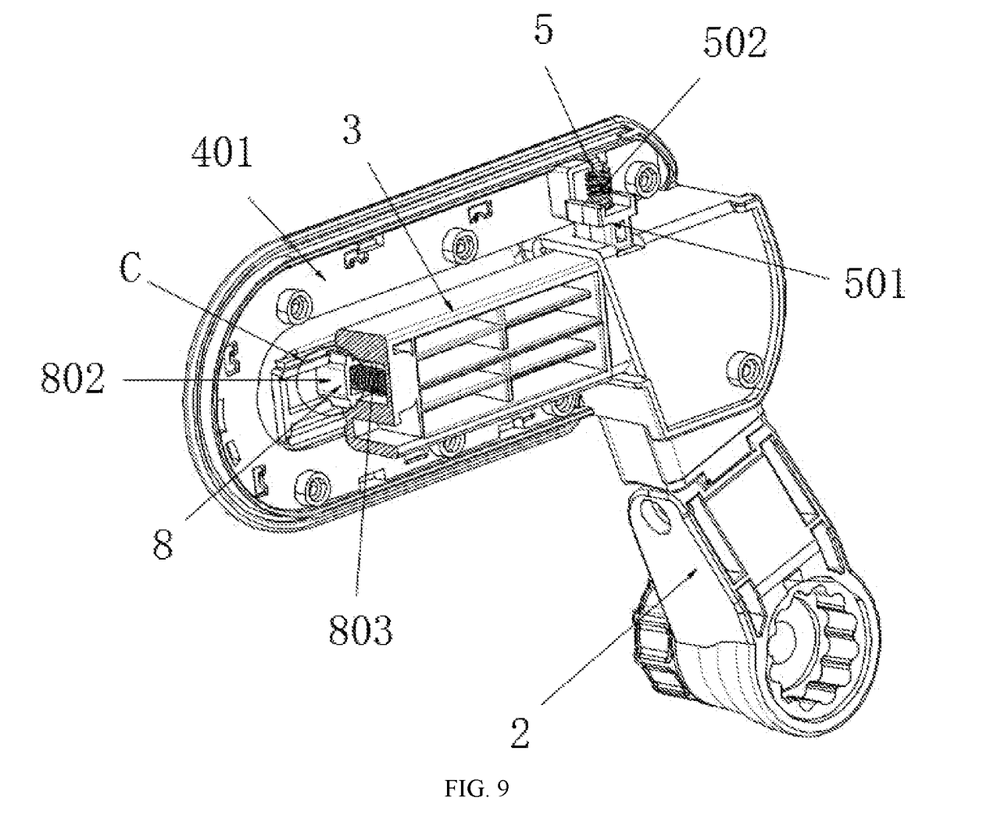
FIG. 9 illustrates a schematic sectional diagram of a rotating block connected to a fixing frame according to the still another embodiment of the disclosure.
Figure 10:
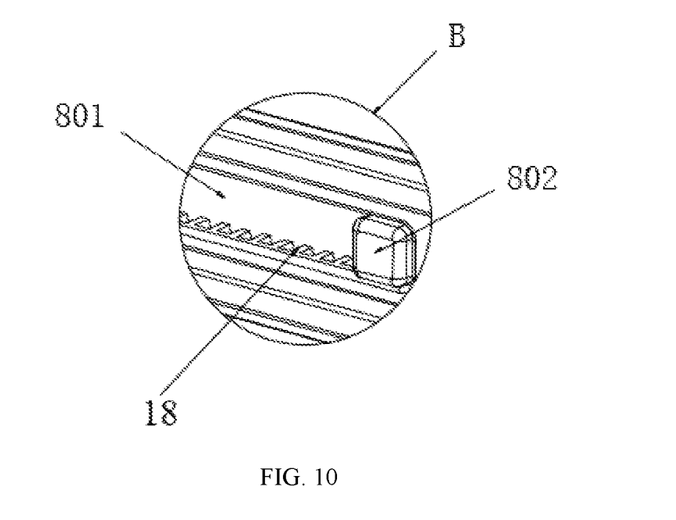
FIG. 10 illustrates an enlarged diagram of a B portion in FIG. 8 according to the still another embodiment of the disclosure.
Figure 11:
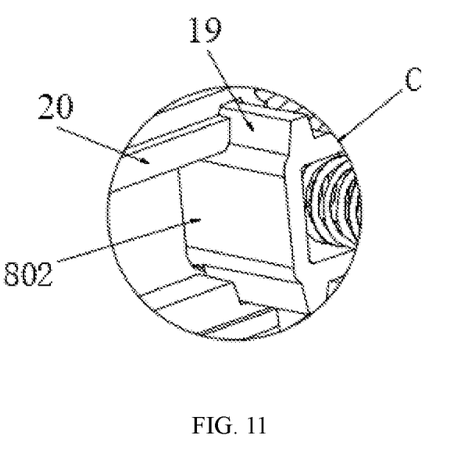
FIG. 11 illustrates an enlarged diagram of a C portion in FIG. 9 according to the still another embodiment of the disclosure.

In an illustrated embodiment of the disclosure, as shown in FIGS. 1-3, an outer wall of the fixed bar 1 is slidably installed with two fixing blocks 10 through two fifth adjusting assemblies; and the two fixing blocks 10 are used to fix the fixed bar 1 on insertion rods of the headrest of the vehicle seat. Each of the two fifth adjusting assemblies includes a pressing block 12, a limiting piece 13, a fifth limiting spring 14, and multiple serrated grooves 11. The multiple serrated grooves 11 defines on the outer wall of the fixed bar 1, each of the two fixing blocks 10 is slidably installed on the fixed bar 1 along a Y-axis direction, the limiting piece 13 is slidably installed inside the fixing block 10 along an X-axis direction in a limited manner, the fifth limiting spring 14 is disposed on an end of the limiting piece 13, and the pressing block 12 is installed on a top end of the fixing block 10 along a Z-axis direction in a limited manner. When the pressing block 12 is pressed down, the limiting piece 13 is hereby squeezed to move along the X-axis direction and detach from one of the serrated grooves 11. An inner portion of the fixed bar 1 defines a moving guide groove 15 for sliding the fixing block 10, the limiting piece 13 defines an inverted trapezoidal notch 16 therein, and a bottom end of the pressing block 12 is a frustum shape. In addition, an end of an outer wall of the fixing block 10 defines a C-shaped groove 101, which is used to clamp the fixing block 10 with one of the insertion rods of the vehicle seat.

In the embodiment, when the disclosure is in use, the fixed bar 1 is placed on a side of the two insertion rods at the bottom end of the headrest of the vehicle seat, and the two fixing blocks 10 are thereby located between the two insertion rods.

When the pressing block 12 is pressed downwards, the pressing block 12 moves down to squeeze the limiting piece 13, and the limiting piece 13 is thereby moved along the X-axis direction, and then the fifth limiting spring 14 is squeezed to contract under the elastic force. The end of the limiting piece 13 disengages from the corresponding serrated groove 11, thereby making the fixing block 10 slide along the moving guide groove 15.

The fixing block 10 is attached to the outer wall of the insertion rod through the C-shaped groove 101, and then the pressing block 12 is released, thereby pushing the limiting piece 13 to move and reset through the elastic force of the fifth limiting spring 14 and clamping the limiting piece 13 in the serrated groove 11 for fixation. Similarly, another fixing block 10 is attached to the outer wall of another insertion rod, and through the mutual use of the above components, the fixed bar 1 is quickly fastened on the vehicle seat.

Embodiment 2

In an illustrated embodiment of the disclosure, as shown in FIGS. 1-7, the fixing frame 401 can also be slidably install on the rotating block 3 through a second adjusting assembly 7 in a limited manner, and the second adjusting assembly 7 is used to replace the first adjusting assembly 6. The second adjusting assembly 7 includes a second limiting block 702, a second limiting spring 703, and multiple second limiting grooves 701; the multiple second limiting grooves 701 are defined on a side of the outer wall of the rotating block 3; the second limiting block 702 is rotatably installed inside the fixing frame 401, two ends of the second fixing block 702 are respectively provided with a button 7021 and a limiting tooth 7022, and the button 7021 penetrates and extends outside of the fixing frame 401, and the second limiting spring 703 is installed on a side of the limiting tooth 7022; and the second limiting spring 703 is used to clamp the limiting tooth 7022 into one of the multiple second limiting grooves 701.

In the embodiment, when the disclosure is in use, the button 7021 is pressed, and the second limiting block 702 is thereby rotated. While the second limiting spring 703 contracts under the force, the limiting tooth 7022 disengages from one of the multiple second limiting grooves 701, causing the fixing frame 401 to slide along the outer wall of the rotating block 3. In addition, the button 7021 is released, under the elastic force of the second limiting spring 703, the second limiting block 702 is pushed to rotate and reset, causing the limiting tooth 7022 to be clamped in another one of the multiple second limiting grooves 701. Thus, the side pillow 4 can be moved and adjusted along the outer wall of the rotating block 3.

Embodiment 3

In an illustrated embodiment of the disclosure, as shown in FIGS. 1-9, the fixing frame 401 can also be slidably installed on the rotating block 3 through a third adjusting assembly 8 in a limited manner, and the third adjusting assembly 8 is used to replace the first adjusting assembly 6 or the second adjusting assembly 7. The third adjusting assembly 8 includes a third limiting groove 801, a third limiting block 802, and a third limiting spring 803; the third limiting groove 801 is defined on the outer wall of the fixing frame 401, and a top end and a bottom end of the third limiting groove 801 are respectively formed with multiple notches 18; the third limiting block 802 is installed on a side of the rotating block 3, and penetrates and extends outside the fixing frame 401 through the third limiting groove 801. The third limiting spring 803 is installed inside the rotating block 3 in a limited manner and is located on an end of the third limiting block 802. The third limiting spring 803 is used to exert an outward groove force on the third limiting block 802. A top end and a bottom end of the third limiting block 802 are respectively formed with multiple protrusions 19 matched with the multiple notches, and the outer wall of the fixing frame 401 is provided with a retaining ring 20 used to limit the third limiting block 802.

In the embodiment, when the disclosure is in use, the third limiting block 802 is pressed, and the third limiting block 802 thereby pushes the third limiting spring 803 to contract under the force, causing the protrusions 19 on the outer wall of the third limiting block 802 (i.e., on the top end and the bottom end of the third limiting block 802) to detach from the third limiting groove 801 (also referred to the corresponding notches 18 disposed on the third limiting groove 801). And then, the side pillow 4 is pulled, the fixing frame 401 is thereby driven to slide along the outer wall of the rotating block 3 in a limited manner. In addition, when the third limiting block 802 is released, the third limiting block 802 drives the protrusions 19 to clamp in the corresponding notches 18 of the third limiting groove 801 for fixation under the elastic force of the third limiting spring 803, thereby realizing the movement and adjustment of the side pillow 4 along the outer wall of the rotating block 3.

It should be noted that for the foregoing embodiments, for the sake of simple description, each of them is expressed as a series of action combinations, but those skilled in the related art should know that the disclosure is not limited by the described sequence of actions. Because according to the disclosure, some steps may be performed in other order or at the same time. Secondly, those skilled in the related art should also be aware that the embodiments described in the specification are all illustrated embodiments, and the actions and modules involved are not necessarily required by the disclosure.

In the several embodiments provided in the disclosure, it should be understood that the disclosed device may be implemented in other ways. For example, the device embodiments described above are only illustrative. For example, the division of the above-mentioned units is only a logical function division, and there may be other divisions in actual implementation, for example, multiple units or components can be combined or integrated into another system, or some features can be ignored, or not implemented. In addition, the illustrated or discussed mutual coupling or communication connection may be through some interfaces; and the indirect coupling or communication connection between devices or units may be in telecommunication or other forms.

The units described above as separate components may or may not be physically separated, and the components illustrated as units may or may not be physical units, that is, they may be located in one place, or they may be distributed on multiple network units. Some or all of the units may be selected according to actual needs to achieve the objectives of the solutions of the embodiments.

The above embodiments are only used to illustrate the technical solution of the disclosure, but not to limit the scope of protection of the disclosure. Apparently, the described embodiments are only parts of embodiments of the disclosure, rather than all of the embodiments of the disclosure. Based on these described embodiments, all other embodiments obtained by those skilled in the related art without creative effort shall fall within the scope of protection of the disclosure. Although the disclosure has been described in detail with reference to the above-mentioned embodiments, those skilled in the related art can still combine, add, delete, or make other adjustments to the features in the various embodiments of the disclosure without any creative work under the condition of no conflict, so as to obtain other different technical solutions that do not deviate from the concept of the disclosure in essence, and these technical solutions also fall within the scope of protection of the disclosure.

What is claimed is:

1. A side pillow assembly, comprising: two rotating blocks and two side pillows, wherein each side pillow is slidably disposed on an outer wall of a corresponding one of the rotating blocks through a fixing frame and a sliding groove; the fixing frame is slidably disposed on the rotating block through a first adjusting assembly in a limited manner; and a clamping assembly is elastically disposed on the fixing frame and is configured to increase a sliding friction on the rotating block.

2. The side pillow assembly as claimed in claim 1, wherein the clamping assembly comprises a spring block and a clamping spring; the spring block is slidably disposed on a top end of the sliding groove in a limited manner, and the clamping spring is disposed on a top end of the spring block in a limited manner; and the clamping spring is configured to exert a downward elastic force on the spring block, and the spring block is configured to compress the rotating block to increase the sliding friction on the rotating block.

3. The side pillow assembly as claimed in claim 2, wherein the first adjusting assembly comprises a first limiting block, a first limiting spring, and a plurality of first limiting grooves; and wherein the plurality of first limiting grooves are formed at a bottom end of the sliding groove, the first limiting block is slidably disposed in the rotating block in a limited manner, and the first limiting spring is disposed at a top end of the first limiting block in a limited manner; and the first limiting spring is configured to exert a downward elastic force on the first limiting block to make the first limiting block be clamped into one of the plurality of first limiting grooves, and the first limiting block clamped inside the one of the plurality of first limiting grooves is configured to limit a sliding connection between the rotating block and the fixing frame.

4. The side pillow assembly as claimed in claim 3, wherein a second adjusting assembly is capable of replacing the first adjusting assembly to make the fixing frame be slidably disposed on the rotating block;

wherein the second adjusting assembly comprises a second limiting block, a second limiting spring, and a plurality of second limiting grooves;

wherein the plurality of second limiting grooves are defined on a side of the outer wall of the rotating block;

wherein the second limiting block is rotatably disposed in the fixing frame, and two ends of the second limiting block are respectively provided with a button and a limiting tooth; the button penetrates and extends outside the fixing frame, the second limiting spring is disposed on a side of the limiting tooth, and the second limiting spring is configured to clamp the limiting tooth into one of the plurality of second limiting grooves.

5. The side pillow assembly as claimed in claim 4, wherein a third adjusting assembly is capable of replacing the first adjusting assembly to make the fixing frame be slidably disposed on the rotating block;

wherein the third adjusting assembly comprises a third limiting groove, a third limiting block, and a third limiting spring;

wherein the third limiting groove is defined on the outer wall of the fixing frame, and a top end and a bottom end of the third limiting groove are respectively formed with a plurality of notches; and wherein the third limiting block is disposed on a side of the rotating block, and penetrates and extends outside the fixing frame through the third limiting groove; the third limiting spring is disposed in the rotating block in a limited manner and is disposed on an end of the third limiting block; the third limiting spring is configured to exert an outward groove force on the third limiting block; and a top end and a bottom end of the third limiting block are respectively formed with a plurality of protrusions matched with the plurality of notches, and the outer wall of the fixing frame is provided with a retaining ring configured to limit the third limiting block.

6. The side pillow assembly as claimed in claim 5, further comprising two connection seats; wherein each of the two connection seats is rotatably connected to the rotating block through a rotating shaft and a fourth adjusting assembly in a limited manner, and the fourth adjusting assembly comprises a spring column, a fourth limiting spring, and a plurality of adjusting grooves; the spring column is slidably disposed in the connection seat in a limited manner, the fourth limiting spring is configured to exert an upward force on the spring column, and the plurality of adjusting grooves are defined at a bottom end of the rotating block.

7. The side pillow assembly as claimed in claim 6, further comprising a fixed bar; wherein two fixing blocks are slidably disposed on an outer wall of the fixed bar through two fifth adjusting assemblies, and the two fifth adjusting assemblies are configured to fix the fixed bar on insertion rods of a headrest of a vehicle seat;

wherein each of the two fifth adjusting assemblies comprises a pressing block, a limiting piece, a fifth limiting spring, and a plurality of serrated grooves;

wherein the plurality of serrated grooves are defined on the outer wall of the fixed bar, and each fixing block is slidably disposed on the fixed bar along a Y-axis direction, the limiting piece is slidably disposed in the fixing block along an X-axis direction in a limited manner, the fifth limiting spring is disposed on an end of the limiting piece, and the pressing block is slidably disposed on a top end of the fixing block along a Z-axis direction in a limited manner; and when the pressing block is pressed downward, the pressing block is configured to compress the limiting piece to move along the X-axis direction and detach from one of the plurality of serrated grooves.

8. The side pillow assembly as claimed in claim 7, wherein the fixed bar defines a moving guide groove therein for sliding the fixing block in a limited manner, the limiting piece defines an inverted trapezoidal notch therein, and a bottom end of the pressing block is a frustum shape.

9. The side pillow assembly as claimed in claim 8, wherein an end of an outer wall of the fixing block defines a C-shaped groove, and the C-shaped groove is configured to clamp the fixing block with one of the insertion rods of the vehicle seat.

10. A side pillow assembly, comprising:
a fixed bar, wherein the fixed bar is provided with a moving guiding groove therein;
two connection seats, wherein the two connection seats are respectively disposed on two ends of the fixed bar through two mounting nuts;
two rotating blocks, wherein each of the two rotating blocks is connected to a corresponding one of the two connection seat through a rotating shaft and an adjusting assembly; the adjusting assembly comprises a spring column, a limiting spring, and a plurality of adjusting grooves; the spring column is disposed inside the connection seat, the limiting spring is disposed on an end of the spring column and is configured to exert a force on the spring column, and the plurality of adjusting grooves are defined at a bottom end of the rotating block;
two side pillows, wherein each side pillow is disposed on an outer wall of a corresponding one of the two rotating block through a fixing frame and a sliding groove, the fixing frame is disposed on the rotating block through another adjusting assembly and a clamping assembly; the clamping assembly comprises a spring block disposed on a top end of the sliding groove and a clamping spring disposed on a top end of the spring block; the another adjusting assembly comprises a limiting block, another limiting spring, and a plurality of limiting grooves; the limiting block is disposed inside the rotating block and disposed in one of the plurality of limiting grooves, and the another limiting spring is disposed on a top end of the limiting block; and two fixing blocks, slidably disposed on an outer wall of the fixed bar and configured to slide along the moving guide groove, wherein each of the two fixing block defines a C-shaped groove configured to match with an insertion rod of a vehicle seat.

11. A side pillow assembly, comprising:

a fixed bar;

rotating blocks, connected to two ends of the fixed bar, respectively;

fixing frames, connected to the rotating blocks, respectively;

side pillows, disposed on the fixing frames, respectively;

adjusting assemblies, wherein each of the adjusting assemblies is connected between a corresponding one of the rotating blocks and a corresponding one of the fixing frames, and is configured to make the rotating block be slidably disposed on the fixing frame; and clamping assemblies, wherein each of the clamping assemblies is disposed on a corresponding one of the fixing frames and configured to increase a sliding friction between the rotating block and the fixing frame.

12. The side pillow assembly as claimed in claim 11, wherein each adjusting assembly comprises a limiting block, a limiting spring, and a plurality of limiting grooves; and wherein the limiting block is slidably disposed in the rotating block and clamped into one of the plurality of limiting grooves, and the limiting spring is disposed at a top end of the limiting block; the limiting block clamped inside the one of the plurality of limiting grooves is configured to limit a sliding connection between the rotating block and the fixing frame.

13. The side pillow assembly as claimed in claim 11, wherein the adjusting assembly comprises a limiting block, a limiting spring, and a plurality of limiting groove;

wherein the plurality of limiting grooves are defined on a side of an outer wall of the rotating block;

wherein the limiting block is rotatably disposed in the fixing frame, and two ends of the limiting block are respectively provided with a button and a limiting tooth; the button penetrates and extends outside the fixing frame, the limiting spring is disposed on a side of the limiting tooth, and the limiting spring is configured to clamp the limiting tooth into one of the plurality of limiting grooves.

14. The side pillow assembly as claimed in claim 11, wherein the adjusting assembly comprises a limiting groove, a limiting block, and a limiting spring;

wherein the limiting groove is defined on an outer wall of the fixing frame, and a top end and a bottom end of the limiting groove are respectively formed with a plurality of notches; and wherein the limiting block is disposed on a side of the rotating block, and penetrates and extends outside the fixing frame through the limiting groove; the limiting spring is disposed in the rotating block in a limited manner and is disposed on an end of the limiting block; the limiting spring is configured to exert an outward groove force on the limiting bloc; and a top end and a bottom end of the limiting block are respectively formed with a plurality of protrusions matched with the plurality of notches, and the outer wall of the fixing frame is provided with a retaining ring configured to limit the limiting block.

* * * * *